No. 885,136. PATENTED APR. 21, 1908.
A. BENTON & C. D. JORDAN.
PLANTER.
APPLICATION FILED SEPT. 10, 1907.
2 SHEETS—SHEET 2.
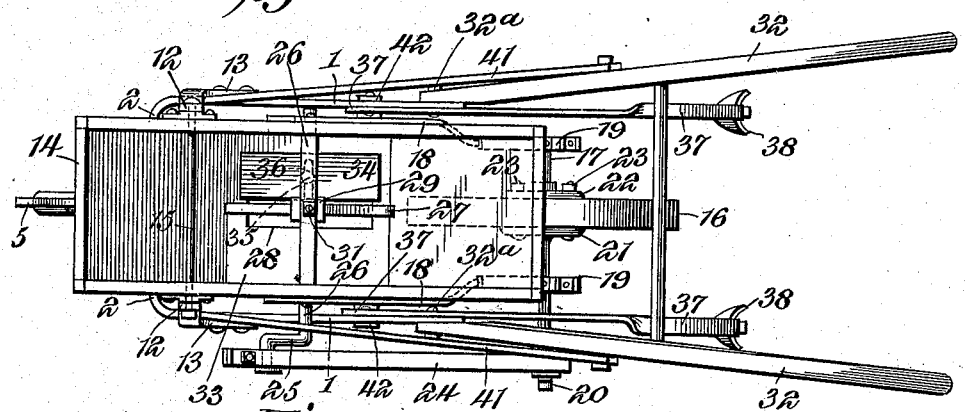
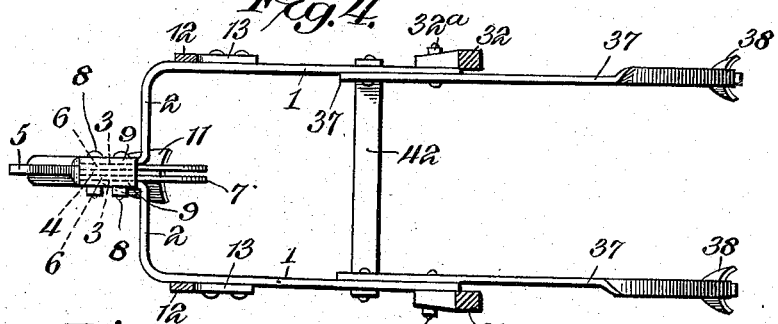
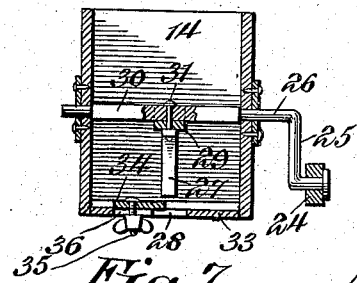
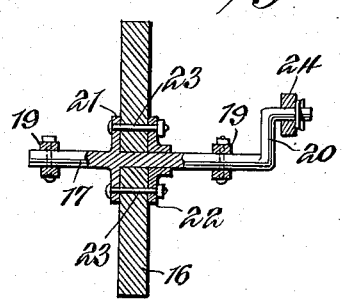
Witnesses
Howard N. Orr
H. J. Riley
Abba Benton and C. D. Jordan, Inventors,
By E. G. Siggers
Attorney

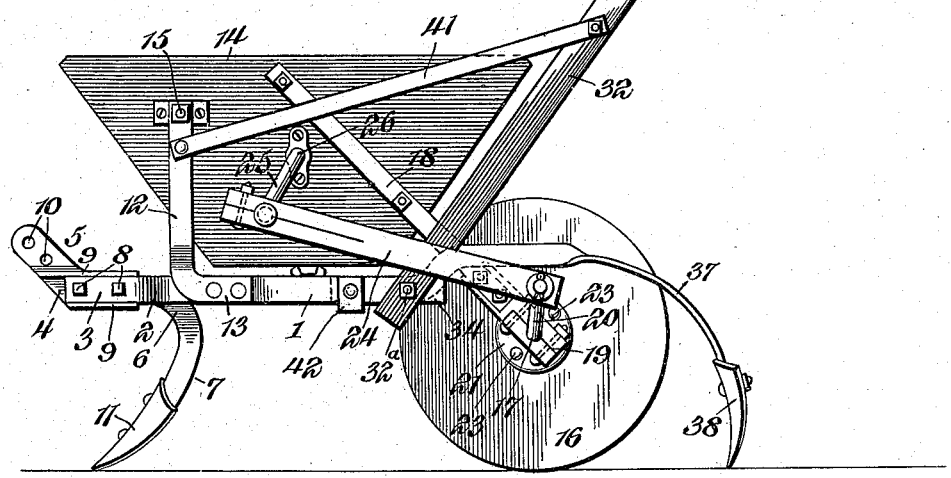

UNITED STATES PATENT OFFICE.

ABBA BENTON AND CHARLES D. JORDAN, OF MONTICELLO, GEORGIA.

PLANTER.

No. 885,136.  Specification of Letters Patent.  Patented April 21, 1908.

Application filed September 10, 1907. Serial No. 392,165.

*To all whom it may concern:*

Be it known that we, ABBA BENTON and CHARLES D. JORDAN, citizens of the United States, residing at Monticello, in the county of Jasper and State of Georgia, have invented a new and useful Planter, of which the following is a specification.

The invention relates to improvements in planters.

The object of the present invention is to improve the construction of planters, and to provide a simple, efficient and compact planter, designed particularly for planting cotton seed, and adapted to open a furrow, drop the seed therein and cover the latter.

A further object of the invention is to provide a planter of this character, adapted to operate effectively on both straight and crooked rows, and provided with a wheel for actuating the seed dropping mechanism capable of upward and downward movement with relation to the frame of the planter and adapted to drop into depressions and ride over stones and clods, whereby the wheel is caused to rotate continuously on all kinds of ground to secure an even flow of the seed.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a planter, constructed in accordance with this invention. Fig. 2 is a longitudinal sectional view of the same. Fig. 3 is a plan view. Fig. 4 is a plan view of the frame of the planter, the supporting arms and the handles being in section. Fig. 5 is a transverse sectional view of the seed box, illustrating the manner of mounting the crank shaft. Fig. 6 is a transverse sectional view of the wheel. Fig. 7 is a detail view, illustrating the manner of attaching the handles and the shanks of the covering blades to the sides of the frame.

Like numerals of reference designate corresponding parts in all the figures of the drawings.

The frame of the planter, which is substantially U-shaped, is composed of two metallic side bars or pieces 1, bent inwardly at the front of the frame to provide transverse portions 2 and having forwardly extending terminals 3, which are spaced apart to receive a shank 4 of a clevis 5 and sides 6 of a plow standard 7. The sides of the plow standard and the shank of the clevis are secured between the forwardly extending ends 3 of the side bars of the frame by transverse bolts 8, and the said shank 4, which is arranged horizontally, is provided with upper and lower longitudinal side flanges 9, arranged in pairs and forming grooves or recesses to receive the sides of the plow standard and the ends 3 of the bars or members of the frame, whereby the parts are reinforced and firmly secured together. The clevis is provided with an inclined upwardly extending portion, having a plurality of perforations 10 and adapted to enable a team to be adjustably connected with a planter in the usual manner. The plow standard is equipped with a suitable foot 11 for opening a furrow, into which the seed is dropped by the means hereinafter described.

The frame is provided at opposite sides with a pair of rigid upwardly extending arms 12, located at the front of the frame and preferably consisting of L-shaped pieces, having short rearwardly extending shanks or portions 13, secured by rivets, or other suitable fastening devices to the outer faces of the side bars or members of the frame. The arms support the front of a seed box 14, provided at opposite sides with bearings for the reception of a suitable pivot 15, which connects the seed box with the arms.

The rear portion of the seed box is supported by a wheel 16, mounted on a crank axle 17, journaled in suitable bearings of a pair of inclined arms 18, extending downwardly and rearwardly from the back of the seed box. The arms consist of straps or bars, secured to the outer faces of the sides of the seed box and projecting therefrom. The lower ends of the arms are provided with suitable bearings 19 for the reception of the axle 17, which is provided at one end with a crank 20. The axle is provided at an intermediate point with an annular flange 21 to which the wheel 16 is bolted. The annular flange 21 is arranged at one of the side faces of the wheel 16, and a removable disk or collar 22 is located at the opposite face, and is pierced by bolts 23 for securing the wheel to the said flange 21. The crank 20 of the axle is connected with the rear end of a pitman 24, which has its front end connected with a crank 25 of a shaft 26, journaled in suitable bearings of the sides of the seed box at the central portion thereof. The shaft 26 carries an agitator 27, and the crank 25, which depends from one end of the shaft 26, is oscillated by the pitman, which is reciprocated by the rotation of the crank 20 of the axle. By this construction the agitator is oscillated to cause the seed to drop through a bottom discharge opening 28 of the seed box. The seed box is provided at its bottom with a curved plate 33, having the said opening 28 and rigidly secured at its ends to the inclined front and rear walls of the seed box. The bottom plate is equipped with a transversely adjustable slide 34, secured to the plate by means of a bolt 35 having a winged nut and operating in a transverse slot 36 of the plate 33. The slot 36, which is arranged at right angles to the opening 28, extends from one side of the same, and the slide 34, which is movable transversely of the plate, is adapted to vary the size of the exposed portion of the slot, or entirely cover the same to cut off the feed.

The agitator consists of a head 29 and a plurality of depending radially arranged arms, which carry the seed backwardly and forwardly over the discharge opening 28, and cause an even flow of seed through the discharge opening, when the wheel 16 rotates. The head 29 of the agitator is provided with a rectangular recess 30 to receive the shaft 26, which is provided with a squared portion to fit the recess 30. The agitator is secured to the journal by means of a bolt 31, or other suitable fastening devices, which pierces the head 29 and the shaft, as clearly shown in Fig. 5 of the drawings.

The frame of the planter is equipped with a pair of handles 32, preferably constructed of wood and secured at their lower ends to the rear ends of the side bars or members of the frame of the planter by means of bolts 32a, which also secure spring stems or standards 37 of covering blades 38 to the said frame. The spring stems or standards 37, which are arched at an intermediate point to clear the crank axle, are curved downwardly and rearwardly, and they are provided with intermediate quarter bends to arrange their front ends flatwise against the inner faces of the sides of the frame. The handles are also connected with the front arms 12 by means of inclined longitudinal braces 41, and the frame is braced at its rear portion by a transverse bar 42. The terminals of the transverse bar 42 are bent upwardly and are secured to the outer faces of the side bars or members of the frame.

The plow is adapted to open a furrow into which the seed is dropped, and the wheel packs the seed while the rear blades 38 throw the soil inwardly and cover the seed. The pivotally mounted hopper and the wheel, which supports the same, are capable of upward and downward movement independently of the planter frame, the front furrow opening device and rear covering blades, and the wheel is thereby permitted to adjust itself to any unevenness of the ground, and a positive operation of the planter and a uniform flow of seed are thereby secured. By this construction the wheel for actuating the dropping mechanism never becomes clogged or stops rotating through any unevenness of the ground. Also by mounting the rear covering blades on the frame, the latter are positively held in operative position and are prevented from skipping when the furrow opening device is in engagement with the ground.

Having thus fully described our invention, what we claim as new and desire to secure by Letters Patent, is:—

1. A planter comprising a frame having spaced side bars, L-shaped arms extending vertically from the side bars of the frame and having horizontal portions secured to the same, a seed box pivoted at its front portion to the arms at the upper ends thereof, inclined bars secured to the sides of the seed box and extending downwardly and rearwardly therefrom and forming projecting arms having terminal bearings, and a wheel journaled in the said bearings and supporting the rear portion of the seed box.

2. A planter comprising a frame composed of side bars or pieces bent inwardly at the front of the frame and connected together, a cross bar connecting the rear portions of the side bars, inclined handles secured to the sides of the frame at the rear ends thereof, a seed box pivotally connected at the front with the frame and having an agitator, a wheel supporting the rear portion of the seed box and provided in rear of the side bars of the frame with a crank axle for operating the agitator, and standards secured to and extending rearwardly from the sides of the frame and arched at an intermediate point to clear the crank axle and carrying covering blades.

3. A planter comprising a frame provided with side bars or members having spaced portions, a clevis provided with a shank arranged between the spaced portions of the frame and having upper and lower longitudinal flanges forming longitudinal recesses to receive the said spaced portions of the frame, a plow standard provided with sides having terminal portions extending longitudinally of the clevis and also arranged in the recesses of the shank and interposed between the same and the sides of the frame, and fastening means piercing the spaced portions of the frame, the shank of the clevis and the sides of the plow standard.

In testimony, that we claim the foregoing as our own, we have hereto affixed our signatures in the presence of two witnesses.

ABBA BENTON.
CHARLES D. JORDAN.

Witnesses:
H. V. B. ALLEN,
A. S. THURMAN.